United States Patent [19]

Amend et al.

[11] Patent Number: 4,950,552
[45] Date of Patent: Aug. 21, 1990

[54] METHOD FOR PROTECTING STAINLESS STEEL PIPE AND THE LIKE IN GEOTHERMAL BRINE SERVICE FROM STRESS CORROSION CRACKING, AND ARTICLES MADE THEREBY

[75] Inventors: William E. Amend, Yorba Linda; Kevin R. Kitz, La Quinta, both of Calif.

[73] Assignee: Union Oil Company of California, Brea, Calif.

[21] Appl. No.: 252,579

[22] Filed: Sep. 30, 1988

[51] Int. Cl.$^5$ .............................................. B32B 15/08
[52] U.S. Cl. .................................................... 428/626
[58] Field of Search ......................................... 428/626

[56] References Cited

U.S. PATENT DOCUMENTS

| 3,677,908 | 7/1972 | Sperl | 428/626 |
| 4,800,134 | 1/1989 | Izaki | 428/626 |

OTHER PUBLICATIONS

"Theory of Corrosion and Protection of Metals—The Science of Corrision", by N. D. Tomashov, translaed and edited by Boris H. Tydell et al., The Macmillan Company, New York, 1966, title page, flyleaf, pp. 287-293, 356-361, and 579-581.

"The Corrosion and Oxidation of Metals: First Supplementary Volume", by Ulick R. Evans, St. Martin's Press, New York, 1968, title page, flyleaf, pp. 143-145, 221-229, 246-257, and 375-379.

Primary Examiner—Peter D. Rosenberg
Attorney, Agent, or Firm—Gregory F. Wirzbicki; Howard R. Lambert; Michael A. Kondzella

[57] ABSTRACT

A method is provided for protecting flow-conducting elements, such as pipe, fittings, valves, and vessels which are constructed of austenitic and duplex stainless steel alloy materials and which are used in hot geothermal brine service from stress cracking caused by small amounts of the brine leaking onto exterior surfaces of such flow-conducting elements. According to the method, residual stress regions of the flow-conducting elements are thermally-sprayed with a metal such as mild steel, aluminum, magnesium, or zinc, which is anodic relative to the stainless steel, to provide a metal coating having a preferred thickness of between about 10 mils and about 20 mils, the preferred metal to be thermally-sprayed onto the stainless steel being mild steel. A metallized article made by the present method is provided.

48 Claims, 1 Drawing Sheet

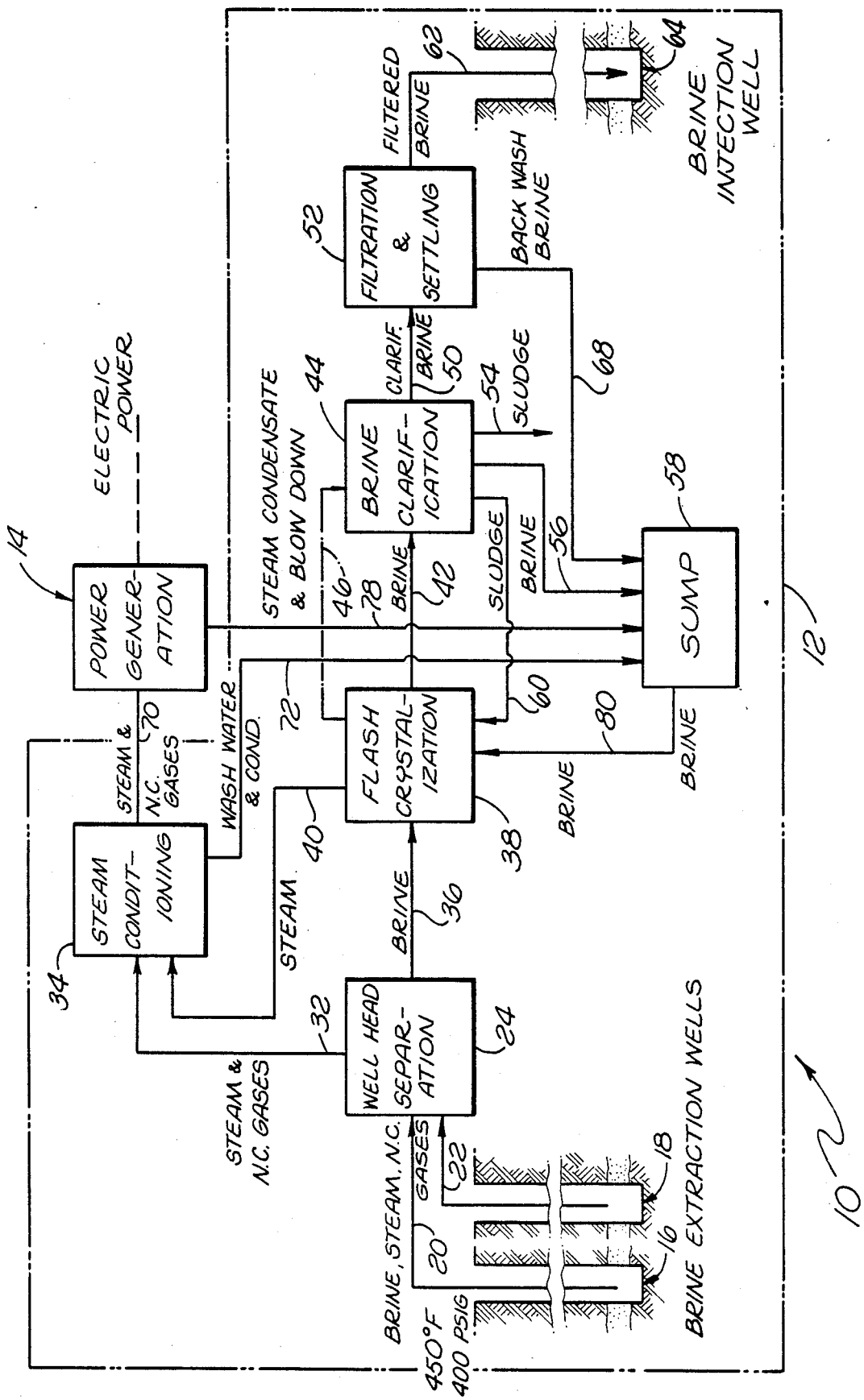

METHOD FOR PROTECTING STAINLESS STEEL PIPE AND THE LIKE IN GEOTHERMAL BRINE SERVICE FROM STRESS CORROSION CRACKING, AND ARTICLES MADE THEREBY

BACKGROUND OF THE INVENTION

1. Field of the Invention

The present invention relates generally to the protection of stainless steel from stress corrosion cracking and, more particularly, to the protection of flow-conducting components, such as pipe and fittings, which are constructed from stainless from chloride stress corrosion cracking when the stainless steel components are used in hot geothermal brine service in which the hot brine is likely to spill or leak onto the exterior of the components.

2. Background Discussion

Subterranean reservoirs of aqueous geothermal fluids—steam, hot water and hot brine—exist in many regions of the world. Such geothermal fluid reservoirs, many of which contain vast amounts of thermal energy, are most common where the earth's near-surface thermal gradient of the earth is abnormally high, as is evidenced by unusually great volcanic, fumarole, and/or geyser activity. As an example, significant geothermal fluid sources are found along the Pacific Ocean Rim—a region long known for its high level of volcanic activity.

Aqueous geothermal fluids have, in some inhabited regions, been used for centuries for the therapeutic treatment of physical disorders. In these and/or in some other inhabited regions, such as Iceland and the Paris Basin of France, geothermal fluids have also long been used as heat sources for industrial processes and for heating dwellings and other buildings. Moreover, in some places, such as Italy and Northern California, geothermal steam has been successfully used for a number of years to generate commercially significant amounts of electric power. In the late 1970s, for example, about 2 percent of all the electric power used in the State of California was produced by geothermal steam at The Geysers in Northern California, and presently enough electric power is generated at The Geysers to satisfy the combined electricity needs of the cities of San Francisco and Oakland, Calif. More recently, moderate amounts of electric power have been generated, notably in the Imperial Valley of Southern California near the Salton Sea, by geothermal brine, which is much more difficult to use than geothermal steam.

Such factors as the steep increases, in the early 1970s, in the cost of petroleum products and natural gas and projected future shortages and high costs of such resources have led to the recently increased interest in further developing the use of geothermal fluids as alternative, and generally self-renewing, electric power plant "fuels." Much of this effort has been and is being directed toward developing more economically practical systems and processes for using geothermal brine to generate electric power because, although more difficult than geothermal steam to use, there are many more good sources of geothermal brine than there are good sources of geothermal steam.

General processes by which geothermal brine can be used to generate electric power have, of course, been known for some time. Geothermal brine, having a wellhead temperature of over about 400° F. and a wellhead pressure of over about 400 p.s.i.g., can, for example, be flashed to a reduced pressure to convert some of the water or brine into steam. Steam produced in this manner is then used in generally conventional steam turbine-type power generators to generate electricity. On the other hand, cooler, less pressurized, geothermal brine can be used in closed-loop, binary fluid systems in which a low-boiling point, secondary liquid is vaporized by the hot brine. The vapor produced from the secondary liquid is then used in a gas turbine-type power generator to generate electricity, the vapor being recondensed and reused. In both such cases, the "used" geothermal brine is most commonly reinjected into the ground to replenish the aquifer from which the liquid was produced and to prevent ground subsidence. Reinjection of geothermal brine is also often important to avoid problems typically associated with the disposal of the large amounts of saline and usually highly contaminated liquid involved.

In spite of such general processes for using geothermal brine for producing electric power being known, difficult and costly problems are commonly encountered with the actual use of the heavily contaminated, saline, and corrosive brines. Moreover, these problems are frequently so costly to overcome that the production of reasonable amounts of electric power at competitive rates by the use of geothermal brines has often been extremely difficult to achieve in many locations.

As mentioned above, many of these serious problems associated with the production and use of geothermal brines for the generating of electric power can be attributed to the unusually complex chemical composition and extremely corrosive nature of many geothermal brines. At aquifer temperatures and pressures—which are often well in excess of 400° F. and 400 p.s.i.g.—aqueous geothermal liquids leach large amounts of salts, minerals, and elements from the aquifer formations, the geothermal liquids (brines) presumably being in chemical equilibrium with their producing formations.

Thus, although their compositions may vary considerably from location to location, geothermal brines typically contain very high levels of dissolved salts and silica, and appreciable amounts of dissolved metals and such non-condensable gases as hydrogen sulfide, ammonia, and carbon dioxide. Geothermal brines are usually acidic, with typical wellhead pH's of between about 5 and about 5.5. As a combined result of their composition and high natural temperature, geothermal brines can be some of the most corrosive liquids known.

Due to this extremely corrosive nature of many geothermal brines, brine-conducting pipe, fittings, and such other equipment as vessels, valves, and pumps, must often be constructed of expensive, normally corrosion-resistant metal alloys, such as special titanium alloys, nickel-based alloys, and/or various types of stainless steel alloys. The need for these costly alloys in geothermal brine handling facilities understandably results in high capital costs which must be passed on to the electric power consumers in the form of higher electricity rates. Since the cost of corrosion-resistant alloys is ordinarily directly related to how corrosion resistant the alloy is, it is, therefore, the general practice to select for any particular geothermal brine application that alloy (or those alloys) which is just sufficiently corrosion resistant for the intended use.

Corrosion problems associated with the production and use of geothermal brines are aggravated by the need for very large, continuous flows of brine to generate even relatively moderate amounts of electric power. As an illustration, the production of only about 10 megawatts of electric power (in a typical pilot plant operation) typically requires in excess of about a million pounds per hour of high temperature and high pressure geothermal brine. A more practical-sized geothermal power plant having about a 50 megawatt capacity typically requires between about 4 and 5 million pounds per hour of high energy geothermal brine. Accordingly, even moderate-capacity geothermal brine power plants ordinarily require several very costly brine production wells (each of which may be several thousand feet deep and cost on the order of a million dollars, exclusive of the cost of the production pipe which may be another million dollars). Also required are extensive amounts of large diameter, corrosion-resistant pipe, fittings, pumps, and valves, as well as at least several huge brine flashing and clarifying vessels, filters and so forth, and one or more brine injection wells, just for the production, steam-extraction, treating, and disposing of the huge flows of geothermal brine needed to produce steam for the associated electric power generating facility.

As above-mentioned, the selection of alloys for use in geothermal brine power plant service is typically based upon obtaining the degree of performance required at the lowest cost. Since the corrosiveness of geothermal brine is, to a great extent, directly related to brine temperature, the usual practice is to select alloys having the highest corrosion resistance (and, hence, usually the highest cost) for use in the highest temperature, downhole regions of brine production and handling systems. Especially corrosion-resistant (and expensive) alloys—such as high nickel-content alloys or special titanium alloys—are, therefore, now typically used or specified for down-hole brine production pipe to assure survival for the intended service life of the facility (which may, for example, be about 30 years). Nickel-based alloys may also be selected for use in furthest upstream regions of the above-ground brine handling system in which the brine remains at about wellhead temperature. Less corrosion resistant (and, hence, less expensive) alloys have been tested and/or commerically used in various services from the wellhead to the cooler, downstream portion of the brine handling facility, such as downstream of flashing stages in which brine temperature is substantially reduced as a result of the steam flashing process.

Representative of such less corrosion resistant alloys are the chrome duplex stainless steel alloys—which have less than about 15 percent nickel content and which are, for example, substantially less costly than most nickel-based or titanium alloys. Such alloys have been used in many applications from the wellhead to the cooler operational stages. On the other hand, austenitic stainless steels, which also contain less than 15 weight percent nickel and are substantially less costly than nickel based alloys, have less corrosion resistance and are therefore usually only used at temperatures below about 250° F. As a result, these types of stainless steels are being used and/or are being designed for use in downstream, above-ground, brine-conducting piping, valves, fittings, vessels, and so forth, in some facilities for producing and handling corrosive geothermal brines.

PROBLEM TO WHICH THE INVENTION IS DIRECTED

Because of the success of such field testing of austenitic and chrome duplex stainless steels in geothermal brine service, it was entirely unexpected when the present inventors recently discovered that some pipe and other brine-handling components constructed of these alloys had failed in actual above-ground, lower temperature geothermal brine service due to chloride stress corrosion cracking. Investigation by the inventors into such failures revealed that most of these failures were apparently caused by relatively small amounts of geothermal brine spilling or leaking onto hot, exterior surfaces of the failed components, especially when the brine had spilled or leaked onto regions of high residual stresses in the components, such as at or near welds.

As a result of these unexpected stress corrosion cracking-type failures, an important need was seen to exist for an effective and economical treatment for protecting such stainless steel components, especially in geothermal brine service, from this type of failure. It is, therefore, a principal objective of the present invention to provide a method for effectively and economically preventing chloride stress corrosion of stainless steel components which are used in geothermal brine service in which hot geothermal brine may leak or spill onto exterior surfaces of the components.

SUMMARY OF THE INVENTION

According to the present invention, a method is provided for protecting stainless steel components from chloride stress corrosion, and, in particular, for protecting stainless steel flow-conducting components, such as pipe, fittings, valves, and vessels, used in hot geothermal brine service from chloride stress corrosion which may be caused by small amounts of the brine leaking or spilling onto external surfaces of the components. The method is particularly adapted for protecting such flow-conducting elements which are constructed of austenitic or chrome duplex stainless steel alloys, for example, a type 2205 (UNS 31803) chrome duplex alloy. The method of the invention comprises thermally-spraying, for example, by flame-spraying or plasma-spraying, a metal having a more negative electrode potential than stainless steel onto stainless steel elements in regions of residual stresses, such as at and near welds. An anodic metal coating having a preferred thickness of between about 5 and about 40 mils (thousandths of an inch), and a more preferred thickness of between about 10 and about 20 mils, is provided on the stainless steel elements by the thermal spraying.

The preferred metals used for thermally-spraying onto the stainless steel elements are mild steel (as defined hereinbelow), aluminum, magnesium, and zinc, with mild steel being the most preferred metal because of its generally more durable nature.

There are provided corresponding thermally sprayed stainess steel articles made by the treatment method of the present invention.

BRIEF DESCRIPTION OF THE DRAWINGS

The present invention will be more readily understood by reference to the drawing, which depicts, in schematic or block-diagram form, an exemplary, geothermal brine electrical power plant in which the present invention, relating to the protection of stainless steel pipe and the like from stress corrosion caused by the leakage of geothermal brine onto outer surfaces of the pipe and the like, can be used to advantage.

DESCRIPTION OF THE PREFERRED EMBODIMENT

A method, according to the present invention, is provided for protecting stainless steel from stress corrosion cracking—especially, chloride stress corrosion cracking—caused by exterior regions of the stainless steel elements being contacted by geothermal brine containing dissolved oxygen. It is, however, considered that the present process can be better understood and appreciated by first briefly considering an exemplary, geothermal brine electrical power plant 10, depicted schematically in the drawing, in which the process can be used to advantage.

Brine handling portion 12 is constructed for extracting the two phase (brine and steam) geothermal fluid from the ground, separating steam, non-condensable gases, and debris from the brine, flashing the brine to produce steam used for power production, treating the flashed brine for scale prevention or removal, clarifying the treated brine to remove suspended particulates, filtering the clarified brine to further remove particulates, and injecting the filtered brine into the ground.

Power generating portion 14 is constructed for using the separated and flashed steam from brine handling portion 12 to generate electric power, for subsequently condensing the steam, and for using the steam condensate in the steam condensing process. The steam condensate may also be used for such other purposes as the purging of seals on various brine and condensate pumps in portions 12 and 14.

More particularly, brine handling portion 12, as shown in the drawing, comprises respective first and second brine extraction wells 16 and 18, each of which may be several thousand feet deep. More or fewer than two such wells 16 and 18 may, however, be needed for some geothermal brine power plants 10, depending upon the required steam production rate, the associated brine extraction rate, and well production capacities.

From wells 16 and 18, the extracted, two-phase mixture of brine and steam (with non-condensable gases), having a typical wellhead temperature and pressure of about 450° F. and about 400 p.s.i.g., is flowed, through respective conduits 20 and 22, to a wellhead separation stage 24. Steam and non-condensable gases, including hydrogen sulfide and carbon dioxide, (and any well debris) are separated from the brine in wellhead separation stage 24. The steam and non-condensable gases are flowed, through a conduit 32, from separation stage 24 to a steam conditioning stage 34, the brine being flowed from the separation stage, through a conduit 36, to a flash-crystallization stage 38.

Geothermal brine entering flash-crystallization stage 38 through conduit 36 is flashed, usually in a series of steps, to a greatly reduced or to atmospheric pressure, thereby converting typically about 10 percent of the brine into steam. At least high pressure steam from flash-crystallization stage 38 is supplied, through a conduit 40, to steam conditioning stage 34. To reduce the formation of siliceous scale on downstream brine handling equipment, flash-crystallization stage 38 may be configured for removing dissolved silica from the brine by a silica crystallization or silica seeding process.

Flashed brine, with siliceous material suspended therein, is flowed from flash-crystallization stage 38, through a conduit 42, into a brine clarification stage 44, wherein most of the siliceous material is permitted to settle from the brine. A comparatively small amount of steam from flash crystallization stage 38 may be provided, through a conduit 46, to brine clarification stage 44 in an amount sufficient to blanket the brine in the various vessels (not shown) in the clarification stage.

Clarified brine overflow, usually still having small amounts of fine suspended siliceous material, is flowed from clarification stage 44, through a conduit 50, into a brine filtration and settling stage 52. Dewatered sludge (still, however, containing some brine) is discharged from brine clarification stage 44, through a conduit 54, for disposal. Brine from the dewatering operation in clarification stage 44 is discharged, through a conduit 56, into a sump 58. A slurry of siliceous sludge is fed back upstream from clarification stage 44, through a conduit 60, into flash-crystallization stage 38 as seed material for the silica crystallization purposes. Alternatively, the silica seed material may be formed in situ by the addition of appropriate chemical materials into flash crystallization stage 38.

Filtered brine from brine filtration and settling stage 52 is pumped, through a conduit 62, into an injection well 64 through which the brine is injected into the ground—usually into the underground aquifer from which it is extracted. As in the case of brine extraction wells, the number of injection wells may vary according to system requirements. Brine from the backwashing of filters in filtration and settling stage 52 is discharged from such stage, through a conduit 68, into sump 58.

Steam and non-condensable gases from conduits 32 and 40 are cleaned in steam conditioning stage 34, the cleaned steam and gases being then flowed, through a conduit 70, into power generating portion 14. Wash water from steam conditioning stage 34 is discharged, through a conduit 72, into sump 58. Some steam condensate and condensate blowdown is typically discharged from power generating portion 14, through a conduit 78, into sump 58.

Brine and condensate from sump 58 is typically pumped back upstream, through a conduit 80, into flash crystallization stage 38 for combining and treating with the main flow of geothermal brine through power plant 10.

As can readily be understood and appreciated, wellhead separation stage 24, flash-crystallization stage 38, brine clarification stage 44, and filtration and settling stage 52 each comprise one or more large vessels, and power plant 10 comprises a large number of flow control valves, fittings, conduits, and related flow components, only the main flow conduits being depicted on the drawing.

Since the corrosive action of the geothermal brine is ordinarily the greatest in regions of power plant 10 where the brine is the hottest, it is, as mentioned above, usually preferred to use nickel-based alloys, which are quite highly resistant to corrosion by geothermal brines, but are very costly, for the construction of pipe, fittings, and so forth, from the wellheads up to separation stage 24, and sometimes up to flash-crystallization stage 38 (depending upon the corrosiveness of the brine involved), where the brine temperature is significantly reduced over its wellhead level. Downstream of wellhead separation stage 24 or flash-crystallization stage 38, as the case may be, austenitic (for example, the AISI 300 series of alloys) or chrome duplex (for example, Sumitomo SM25Cr) stainless steels have been used for pipe, fittings, vessels, and so forth.

As above stated, however, stainless steel components (constructed, for example, of 316L—UNS number S31603—austenitic stainless steel and Sumitomo SM25Cr, a 25 percent chrome duplex stainless steel) have failed in actual hot geothermal brine service use due to chloride stress corrosion cracking—apparently caused by small amounts of geothermal brine leaking or spilling onto the hot exterior of the failed parts.

In attempting to overcome these stress corrosion cracking problems, the present inventors have tried relieving residual stresses in stainless steel components by heat treating and by shot peening the components. In addition, protective treatment of stainless steels by the thermal-spraying of anodic (relative to the stainless steel) metals, such as aluminum and mild steel which have a negative electropotential relative to the stainless steel onto which the coating is applied, has been evaluated by the present inventors. (The term "mild steel" is used herein in its generally understood sense to mean a low alloy steel, for example, a low carbon steel having less than about 0.25 percent carbon content.)

Of the above-mentioned types of treatments of austenitic and chrome duplex stainless steel components, the present inventors have determined that the thermal-spraying of aluminum or mild steel onto regions of residual stresses provides the best protection against stress corrosion cracking in a geothermal brine environment in which small amounts of the brine are leaked or spilled onto the components. In this regard, it is preferred that the thickness of the thermally-sprayed metal coating be between about 5 mils and about 40 mils; more preferably, the thickness of the coating is between about 10 and about 20 mils.

Because welds usually create an electronegative potential due to differences in composition between a weld and the welded metal, and also because welds are a source of residual stresses caused, for example, by the localized heating associated with welding, welds and heat-affected regions around welds are generally more susceptible to stress corrosion cracking than are most other regions of the metal. However, since the extent of the heat-affected regions around welds cannot be readily determined by non-destructive techniques, it is preferred that the thermally-sprayed protective metal coatings extend for substantial distances beyond welds. The same is, of course, true for thermally-sprayed coatings around such regions of structural change as holes, recesses, or abrupt changes in cross section which may result in residual stresses in the stainless steel components.

An advantage, however, of the present, thermally-sprayed metallization method of protecting stainless steel components from stress corrosion cracking is that 100 percent coverage of the residually stressed region is generally not necessary to be effective. This aspect is important in the thermal-spraying of such installed components as pipe sections, since it may sometimes be difficult to flame spray a complicated shape without leaving some voids in the coating; it is also important since thermally-sprayed coatings on stainless steel components may subsequently become worn or eroded in places. Although it is, of course, generally preferred that the thermally-sprayed coating cover 100 percent of the residually stressed region, it is usually satisfactory if at least about 90 percent to about 95 percent of the residual stress regions be coated in the thermal-spraying operation.

Although the use of mild steel for a thermal-sprayed coating is generally preferred over the use of aluminum because the mild steel is more wear and corrosion resistant than aluminum, it will be appreciated that aluminum can also be used to advantage, Moreover, other metals, such as magnesium and zinc, which also have electric potentials which are more negative than stainless steel can also be used to protect stainless steel alloys by being thermally-sprayed thereonto.

The present invention is further illustrated by the following EXAMPLES which are illustrative of various aspects of invention and are not intended to limit the scope of the invention as defined by the appended claims.

EXAMPLE 1

Four flat test specimens, each about 6 inches square and each having a thickness shown below in Table 1, are obtained from each of the following five types of alloys:

(1) type 316L (UNS number S13603, an austenitic stainless steel having a chromium content of between about 16 and 18 percent and a nickel content of between about 10 and 14 percent);

(2) Sandvik SAF 2205 (UNS number 31803, a chrome duplex stainless steel alloy having a chromium content of about 22 percent and a nickel content of about 5.5 percent);

(3) Sumitomo SM25Cr (a proprietary chrome duplex stainless steel alloy having a chromium content of about 25 percent and a nickel content of about 7 percent);

(4) Alloy 625 (UNS number N06625, a super-austenitic alloy having a chromium content of about 21 percent and a nickel content of about 60–62 percent); and (5) Hastelloy C-276 (a proprietary nickel-based alloy having a nickel content of about 47 percent).

All twenty of the test specimens are visually inspected and are seen to be free of cracks.

Three carbon steel pipe sections, each about 10 inches in diameter and about 5 to 6 feet long, are provided with internal resistance heaters to enable the simulation of a hot geothermal brine-conducting pipeline.

Five test samples—one of each type of the five alloys listed above—are tack welded in an axially spaced apart relationship to one of the pipe sections to form a first test spool. A second test spool is similarly formed. A third test spool is prepared by tack welding the remaining two specimens of each alloy type in an edge-to-edge relationship to the third pipe section, the five pairs of test specimens being arranged in an axially spaced apart relationship on the pipe.

High residual stresses are then produced in each of the twenty test specimens by applying to central regions of each a generally circular weld bead, about 2.5 inches in diameter and with a slight "weave." A second weld bead is applied completely around and immediately adjacent to the first weld bead on all the test specimens.

The first and second test spools are positioned about 2 inches beneath a manifold pipe through which a slipstream of geothermal brine, at a temperature of about 225° F., is diverted from a brine clarification outflow conduit (corresponding generally to conduit 50 in the drawing). The two test assemblies are heated to about 570° F. by the internal resistance heaters and brine is dripped, through valves, from the manifold pipe onto the central region of each of the test specimens at an average rate of about 250 ml per minute. The duration of the test is about 21 days for one of the two test assemblies and is about 25 days for the other test assembly.

The third test spool assembly is heated to a temperature of about 400° F. and is positioned about 2 inches beneath a similar manifold from which the 225° F. geothermal brine is dripped onto abutting edges of each pair of similar test specimens at an average rate of about 250 ml per minute for a test duration of about 14 days.

During all of the above-described testing, brine salt deposits are wiped from the test specimens every few days.

After the testing is completed, the tack welds attaching the test specimens to the pipe sections are cut and the specimens are removed and cleaned by scrubbing under water and then by glass bead blasting. Both sides of the 316L, 625, and Hastelloy C-276 test specimens are visually inspected for cracks using a dye penetrant process. Both sides of the SAF 2205 and the SM25Cr chrome duplex alloy test specimens are visually inspected using a dry magnetic particle inspection (MPI) process.

By such inspection techniques, cracks are found in the brine-exposed side of all twelve of the 316L, SAF 2205, and SM25Cr test specimens and one small crack is found in the back side of one of the 625 test specimens subjected to the 400° F. test. No cracks are found in the other three remaining 625 test specimens or in any of the four Hastelloy C-276 test specimens. Most of the cracks found in the 316L test specimens are located away from the weld beads and heat-affected areas, whereas most of the cracks in the SAF 2205 and SM25Cr test specimens are in the weld metal near the fusion line.

The thirteen test specimens in which cracks are found are metallographic cross sectioned along the cracks and are examined under a microscope, with the following results:

(i) The cracks in the 316L, SAF 2205 and SM25Cr test specimens are, in general, transgranular and branched, as is characteristic of chloride stress corrosion cracking; and (ii) The single, small crack in the 625 test specimen is not characteristic of a stress corrosion crack.

The remaining three 625 test specimens and all of the Hastelloy C-276 test specimens are metallographically cross-sectioned through their weld beads and heat-affected areas and the absence of cracks in these test specimens is verified. Since no cracks are seen in the remaining three 625 test specimens, the crack seen in one of the Alloy 625 test specimens is concluded to be due either to a manufacturing defect or to the welding process.

The results of the testing, which are summarized in Table 1, indicate that the 316L, 2205, and SM25Cr stainless steel alloys can be expected to develop chloride stress corrosion cracking in an environment in which geothermal brine is leaked or spilled onto hot exterior surfaces of flow-conducting elements constructed of these alloys. The testing further indicates that brine flow-conducting elements constructed from the 625 and Hastelloy C-276 nickel-based alloys would probably not be susceptible to chloride stress corrosion cracking in a similar use and environment.

TABLE 1

| ALLOY | SAMPLE THICKNESS, INCHES | TEMPERATURE SET POINT, °F. | EXPOSURE TIME | CRACKS FOUND? |
|---|---|---|---|---|
| Type 316L | ⅛ | 400 | 2 weeks | yes |
| Type 316L | ⅛ | 400 | 2 weeks | yes |
| Type 316L | ⅛ | 570 | approx. 3 weeks | yes |
| Type 316L | ⅛ | 570 | approx. 3 weeks | yes |
| 2205 duplex | ⅛ | 400 | 2 weeks | yes |
| 2205 duplex | ⅛ | 400 | 2 weeks | yes |
| 2205 duplex | ⅛ | 570 | approx 3 weeks | yes |
| 2205 duplex | ⅛ | 570 | approx. 3 weeks | yes |
| SM 25 Cr duplex | 0.365 | 400 | 2 weeks | yes |
| SM 25 Cr duplex | 0.365 | 400 | 2 weeks | yes |
| SM 25 Cr duplex | 0.100 | 570 | approx. 3 weeks | yes |
| SM 25 Cr duplex | 0.100 | 570 | approx. 3 weeks | yes |
| Hastelloy C-276 | ⅛ | 400 | 2 weeks | no |
| Hastelloy C-276 | ⅛ | 400 | 2 weeks | no |
| Hastelloy C-276 | ⅛ | 570 | approx. 3 weeks | no |
| Hastelloy C-276 | ⅛ | 570 | approx. 3 weeks | no |
| Alloy 625 | ⅛ | 400 | 2 weeks | no |
| Alloy 625 | ⅛ | 400 | 2 weeks | yes |
| Alloy 625 | ⅛ | 570 | approx. 3 weeks | no |
| Alloy 625 | ⅛ | 570 | approx. 3 weeks | no |

EXAMPLE 2

Four flat test specimens, each about 6 inches square and having a thickness shown below in Table 2, are obtained of both alloy type 904L (a generic super-austenitic stainless steel having a chromium content of about 19 to about 23 percent and a nickel content of about 23 to about 28 percent) and type 2205 (a generic chrome duplex stainless steel having a chromium content of about 25 percent and a nickel content of about 5 percent) alloys. In addition, two test specimens, each about 2 inches by 4 inches and about 0.115 inch thick, are obtained of Sandvik SAF 2507 (a proprietary chrome duplex stainless steel alloy having a chromium content of about 27 percent and a nickel content of about 7 percent), these two test specimens being subsequently butt welded together to form a single test specimen about 4 inches square.

Concentric, circular weld beads, similar to those described above in Example 1, are applied to all eight of the 904L and 2205 stainless steel test specimens. Thereafter, the eight type 904L and Alloy 2205 test specimens are divided into four pairs, each pair consisting of one type 904L specimen and one type 2205 specimen. One of these pairs of test specimens is thermally stress relieved by heating at about 1550° F. for about 2 hours. Another pair of the test specimens is mechanically stress relieved by shot peening with No. S-230 shot at an measured intensity of 0.006/0.010A, (a standard measurement of shot peening intensity, as is known in the art). The test specimens in a third pair of the test specimens are (i) grit-blasted to give a sawtooth finish to the surface, (ii) heated to about 110° F., and (iii) flame-sprayed with aluminum to provide an aluminum coating about 9 mils thick on both sides. The specimens in the fourth pair of test specimens are left untreated to serve as control or "benchmark" specimens.

A test spool is constructed by tack welding the test specimens, in an axially spaced apart relationship, onto a section of internally heated, carbon steel pipe, similar to the pipe sections described in Example 1 above. Concentric, circular weld beads, similar to those described above in Example 1, are then applied to the Sandvik SAF-2507 alloy test specimen.

The test spool is positioned beneath the geothermal brine slipstream manifold disclosed in Example 1 and are heated to a temperature of about 570° F. Geothermal brine is dripped onto the central region of each test specimen at the rate disclosed in Example 1. The temperature of the test spool assembly is maintained at about 570° F. for about 5 days and is then reduced to about 400° F. for another 13 days. Salt deposits are periodically wiped from the test specimens. On the 10th day of testing, the Sandvik SAF 2507 and the heat treated and shot peened specimens of Alloy 2205 are seen to have visible cracks.

After 18 days of testing, the tack welds attaching the test specimens to the pipe section are broken and the test specimens cleaned in the manner described in Example 1. The aluminum coating is removed from the type 904L and 2205 test specimens by soaking the specimens in dilute hydrochloric acid or sodium hydroxide.

The test specimens are then examined using either dye penetrant or MPI inspection techniques. As summarized in Table 2, cracks are then seen in the Sandvik SAF 2507 alloy specimens and in all of the Alloy 2205 test specimens except those which had been flame-sprayed with aluminum. None of the type 904L test specimens are found to be cracked.

Metallographic cross sections are made through typical cracks in the test specimens to study the crack morphology.

The tests show that the flame-spraying of an aluminum coating onto a welded Alloy 2205 chrome duplex stainless steel specimen is effective in protecting the material from chloride stress corrosion under a brine contact condition which causes stress corrosion cracking of as-welded and stress relieved (that is, heat treated and shot peened) specimens of the same material.

EXAMPLE 3

Fourteen flat test specimens, each measuring 4 by 4 inches and having a thickness of 0.125 inches, are obtained of type 2205 chrome duplex stainless steel and are inspected for cracks and other visible defects. These fourteen test specimens are then tack welded, in pairs, to a pipe section of the type described in Example 1, with each pair of specimens being spaced apart from each adjacent pair of specimens, so as to provide a test spool.

Thereafter, concentric, circular weld beads, similar to those described above in Example 1, are applied to all fourteen test specimens. One pair of the test specimens in left untreated in the as-welded condition, the other six pairs of test specimens being treated as described below:

1. one pair of specimens is shot peened in the manner described above in Example 2;

2. one pair of specimens in heat treated at between about 1850°-1900° F. for approximately one hour by the application of heating pads to the specimens;

3. one pair of specimens is covered with Knight type NT-400 tape (available from Rustol Chemical Company, Ltd., 400 Montgomery Street, Suite 714, San Francisco, Calif.) in the manner recommended by the manufacturer, the wrapping on one of the test specimens being mechanically scraped to simulate in-use damage; and 4. exposed surfaces of the remaining three pairs of specimens are prepared for metallization in the manner described above in Example 2, the three pairs of specimens being metallized in the following manner:
   (1) one pair of specimens is flame-sprayed with mild steel to provide a metal coating having a thickness of about 5–10 mils;
   (ii) one pair of specimens is flame-sprayed with aluminum to provide a metal coating having a thickness of about 5–10 mils; and
   (iii) one pair of specimens is plasma-sprayed with Hastelloy C-276 to provide a metal coating having a thickness of about 5–10 mils.

Before the metal coating is applied, each of the specimens is marked to provide three one quarter-inch wide strips which are not metallized so as to simulate in-use conditions wherein the coatings may be damaged. The pair of aluminized samples are sealed with an epoxy topcoat so as to decrease the consumption rate of the aluminum by acting as a partial barrier between the aluminum and the brine.

TABLE 2

| ALLOY | SAMPLE THICKNESS, INCHES | TEMPERATURE SET POINT, °F. | EXPOSURE TIME | CRACKS FOUND? |
|---|---|---|---|---|
| 2205 duplex | | | | |
| as welded | ⅛ | 570/400 | 18 days | yes |
| shot peened | ⅛ | 570/400 | 18 days | yes |
| heat treated | ⅛ | 570/400 | 18 days | yes |
| Aluminum coated | ⅛ | 570/400 | 18 days | no |
| 940L | | | | |
| as welded | 0.215 | 570/400 | 18 days | no |
| shot peened | 0.215 | 570/400 | 18 days | no |
| heat treated | 0.215 | 570/400 | 18 days | no |
| Aluminum coated | 0.215 | 570/400 | 18 days | no |
| 2507 duplex | | | | |
| as welded | 0.115 | 570/400 | 18 days | yes |
| as welded | 0.115 | 570/400 | 18 days | yes |

The test specimens are heated, by the internal heaters in the test spool, to a temperature of about 470° F., and the test spool is positioned beneath a brine drip manifold of the type described above in Example 1. Geothermal brine, at a temperature of about 224° F., is dripped onto each of the test specimens at a rate of about 250 ml per minute for a duration of about 26 days. Salt deposits are wiped from the samples every few days.

At the conclusion of the 26 days of testing all of the test specimens are removed from the test spool for evaluation. Scale deposits are removed from the specimens by scrubbing under water with a stiff brush and then by blasting with glass beads. The Knight tape is removed by wire brushing and glass bead blasting. After being cleaned in this manner, the specimens are examined under a 10-power stereomicroscope for cracks. In addition, the specimens are subject to magnetic particle inspection (MPI) to detect cracks. The six thermally-sprayed specimens are inspected on the uncoated side and in the uncoated strips for cracks. After visual and MPI examination, specimens suspected of having cracked and the thermally-sprayed specimens are cross sectioned at a minimum of four locations to confirm the presence or absence of cracks.

As summarized in Table 3 below, none of the thermally-coated specimens are found to have cracks. In contrast, both of the untreated, as-welded specimens and one each of the heat treated, shot peened, and Knight tape-wrapped specimens are found to have cracks characteristic of chloride stress corrosion cracking.

The tape-wrapped specimen having cracks is the specimen with the intentionally damaged wrap. The heat treated specimens appear more corroded than the other specimens. The absence of cracking in the specimens plasma-coated with Hastelloy C-276 is unexpected since the metal coating is cathodic relative to the stainless steel, rather than anodic, and may be attributable to the pre-plasma-spraying preparation of the specimens.

TABLE 3

| ALLOY 2205 DUPLEX | SAMPLE THICKNESS | TEMPERATURE SET POINT | EXPOSURE TIME | PLATES CRACKED? |
|---|---|---|---|---|
| as welded | ⅛ inch | 470 F. | 26 days | yes (2) |
| shot peened | " | " | " | yes (1) |
| heat treated | " | " | " | yes (1) |
| Knight 400 tape wrap | " | " | " | yes (1) |
| mild steel coated | " | " | " | no |
| Hastelloy coated | " | " | " | no |
| sealed aluminum coated | " | " | " | no |

Notes:
(1) one plate cracked
(2) two plates cracked

It will be appreciated that a corresponding article of manufacture, comprising an article made of stainless steel, such as austenitic or chrome duplex stainless steel, having applied thereto a flame-sprayed coating of an anodic metal, especially, but not limited to, mild steel or aluminum, is also provided by the present invention.

Although there has been described above a method for protecting stainless steel alloys from stress corrosion cracking caused by external contact with leaked or spilled geothermal brine—and a corresponding article of manufacture—in accordance with the present invention for the purpose of illustrating the manner in which the invention may be used to advantage, it will be appreciated that the invention is not limited thereto. Accordingly, any and all modifications or variations which may occur to those skilled in the art should be considered to be within the scope of the invention as defined in the appended claims.

I claim:

1. A method for protecting a stainless steel flow-conducting component used in hot geothermal brine service from chloride stress corrosion caused by contact of geothermal brine with an exterior surface of said component comprising thermally coating said exterior surface with a metal having an electrode potential more negative than that of the stainless steel being protected.

2. A method for protecting a flow-conducting component constructed of stainless steel containing less than about 15 weight percent nickel used in geothermal brine service from chloride stress corrosion caused by contact of geothermal brine having a temperature of at least about 150° F. with an exterior surface of said component comprising thermally-spraying onto an exterior surface thereof a metal selected from the group consisting of mild steel, aluminum, zinc, magnesium, and mixtures thereof to provide a metal coating of at least about 5 mils.

3. The protective method as claimed in claim 2 wherein said stainless steel is selected from austenitic stainless steel and chrome-duplex types of stainless steels.

4. A method for protecting a stainless steel flow-conducting component used in geothermal brine service from stress corrosion cracking caused by contact of geothermal brine with an exterior surface of said component comprising thermally-spraying onto said exterior surface in a region of residual stress a metal having an electrode potential more negative than that of the stainless steel being protected.

5. A method for protecting a stainless steel flow-conducting component through which is flowed a corrosive geothermal brine having a temperature of at least about 150° F. from stress corrosion cracking caused by contact of geothermal brine with an exterior surface of said component comprising thermally-spraying mild steel onto said exterior surface in a region of residual stress to provide thereon a mild steel coating of at least about 5 mils.

6. The protective method as claimed in claim 5 wherein the stainless steel flow-conducting component is constructed of a stainless steel selected from austenitic stainless steel and chrome-duplex types of stainless steels.

7. An article consisting of stainless steel having a surface thereof coated with a metal having an electrode potential more negative than that of said stainless steel, said stainless steel being selected from austenitic stainless steel and chrome-duplex stainless steel, said metal being coated upon said surface to a thickness of at least about 5 mils.

8. An article for use in hot geothermal brine service consisting of a stainless steel flow-conducting component having a nickel content less than about 18 percent, an exterior surface of said component having thereon a coating of a metal selected from the group consisting of mild steel, aluminum, magnesium, zinc and mixtures thereof, said coating having a thickness of about 5 to about 40 mils.

9. The article as claimed in claim 8 wherein said stainless steel is selected from the group consisting of austenitic steel and chrome-duplex steel.

10. A stainless steel component having an interior surface for conducting a flow of hot geothermal brine through said component and an external surface, at least a portion of which is coated with a metal having an electrode potential more negative than said stainless steel.

11. The component as claimed in claim 10 wherein said stainless steel is selected from the group consisting of austenitic stainless steel and chrome-duplex stainless steel.

12. The protective method as claimed in claim 1, wherein said metal is selected from the group consisting of mild steel, aluminum, magnesium, zinc, and mixtures thereof.

13. The protective method as claimed in claim 1, wherein said metal is aluminum.

14. The protective method as claimed in claim 13, including the added step of coating the aluminum coating with an epoxy material.

15. The protective method as claimed in claim 1, wherein said metal is mild steel.

16. The protective method as claimed in claim 1, wherein said metal is thermally-sprayed onto said components so as to provide a coating thereon which has a thickness of between about 5 and about 40 mils.

17. The protective method as claimed in claim 1, wherein said metal is thermally-sprayed onto said components so as to provide a coating thereon which has a thickness of between about 10 and about 20 mils.

18. The protective method as claimed in claim 1, wherein the stainless steel from which said components are constructed is at a temperature of at least about 100° F. when said metal is thermally-sprayed thereonto.

19. The protective method as claimed in claim 1 wherein the stainless steel has a nickel content of between about 5 to about 18 percent.

20. The protective method as claimed in claim 1, wherein the elements onto which said one or more metals are thermally-sprayed are constructed of austenitic or chrome-duplex stainless steel.

21. The protective method as claimed in claim 2, wherein said metal is mild steel.

22. The protective method as claimed in claim 2, wherein the stainless steel component is at a temperature of at least about 100° F. when the metal is thermally-sprayed thereonto.

23. The protective method as claimed in claim 4, wherein said metal is selected from the group consisting of mild steel, aluminum, magnesium, zinc, and mixtures thereof.

24. The protective method as claimed in claim 4, wherein said metal is thermally-sprayed onto said components so as to provide a coating which has a thickness of at least about 5 mils.

25. The protective method as claimed in claim 3, wherein said metal is thermally-sprayed onto said components so as to provide a coating which has a thickness of between about 10 and about 20 mils.

26. The protective method as claimed in claim 3, wherein the stainless steel component is at a temperature of at least about 100° F., when the metal is thermally-sprayed thereonto.

27. The protective method as claimed in claim 3, wherein the stainless steel from which said components are constructed has a nickel content of between about 5 to about 18 percent.

28. A method for protecting stainless steel elements from stress corrosion cracking, said method comprising thermally-sprayed onto said elements a metal having an electrode potential more negative than that of the stainless steel from which said elements are constructed.

29. The protective method as claimed in claim 28, wherein said metal is selected from the group consisting of mild steel, aluminum, magnesium, zinc, and mixtures thereof.

30. The protective method as claimed in claim 28, wherein said metal is aluminum.

31. The protective method as claimed in claim 28, wherein said metal is mild steel.

32. The protective method as claimed in claim 28, wherein said metal is thermally-sprayed onto said elements to provide a coating which has a thickness of between about 5 and about 40 mils.

33. The protective method as claimed in claim 28, wherein said metal is thermally-sprayed onto said elements to provide a coating which has a thickness of between about 10 and about 20 mils.

34. The protective method as claimed in claim 28, wherein the stainless steel elements are at a temperature of at least about 100° F. when said metal is thermally-sprayed thereonto.

35. The protective method as claimed in claim 28 wherein the stainless steel from which said elements is constructed has a nickel content of between about 5 and about 18 percent.

36. The article as claimed in claim 7, wherein said metal is selected from the group consisting of mild steel, aluminum, magnesium, zinc, and mixtures thereof.

37. The article as claimed in claim 7, wherein the metal is mild steel.

38. The article as claimed in claim 7, wherein the metal is aluminum.

39. The article as claimed in claim 5, wherein the aluminum is coated with an epoxy material.

40. The article as claimed in claim 5, wherein the thickness of the coating is between about 10 and about 20 mils.

41. The article as claimed in claim 5, wherein the article has welded regions, and wherein the metal coating substantially covers said welded regions.

42. The article as claimed in claim 5, wherein the stainless steel has a nickel content of less than about 18 percent.

43. The article as claimed in claim 10, wherein said metal is selected from the group consisting of mild steel, aluminum, magnesium, zinc, and mixtures thereof.

44. The article as claimed in claim 10, wherein the metal is mild steel.

45. The article as claimed in claim 10, wherein the metal is aluminum.

46. The article as claimed in claim 10, wherein the thickness of the coating is between about 5 and about 40 mils.

47. The article as claimed in claim 10, wherein the article has welded regions, and wherein the metal coating substantially covers said exterior surface of the article in said welded regions.

48. The article as claimed in claim 10, wherein the stainless steel has a nickel content of between about 5 and about 18 percent.

* * * * *